United States Patent [19]

Hoy et al.

[11] 4,133,651

[45] Jan. 9, 1979

[54] METHODS FOR REMOVING RADIOACTIVE ISOTOPES FROM CONTAMINATED STREAMS

[75] Inventors: David R. Hoy, Grove City; Thomas N. Hickey, Worthington; Ivars S. Spulgis, Columbus; Harold C. Parish, Dublin, all of Ohio

[73] Assignee: CVI Corporation, Hilliard, Ohio

[21] Appl. No.: 677,581

[22] Filed: Apr. 16, 1976

Related U.S. Application Data

[63] Continuation-in-part of Ser. No. 640,108, Dec. 11, 1975.

[51] Int. Cl.² ............................................. B01D 53/02
[52] U.S. Cl. ................................. 55/75; 55/270; 55/387; 55/484; 55/485; 73/38; 73/421.5 R
[58] Field of Search ............... 55/387, 74, 270, 75, 55/484, 485, 512–519; 73/38, 76, 421.5 R, 422 R

[56] References Cited

U.S. PATENT DOCUMENTS

| | | | |
|---|---|---|---|
| 2,579,477 | 12/1951 | Dauphinee | 55/387 |
| 3,143,997 | 8/1964 | Norberg et al. | 55/DIG. 16 |
| 3,873,287 | 3/1975 | Barneby | 55/387 |
| 3,961,920 | 6/1976 | Gilbert | 55/387 |
| 3,964,890 | 6/1976 | Bonn | 55/484 |

FOREIGN PATENT DOCUMENTS

| | | | |
|---|---|---|---|
| 2271744 | 5/1975 | France | 55/387 |
| 308790 | 5/1930 | United Kingdom | 55/484 |

Primary Examiner—Bernard Nozick
Attorney, Agent, or Firm—Charles N. Quinn

[57] ABSTRACT

Methods for removing radioactive isotopes from contaminated gas streams for use in atmospheric containment and cleanup systems in nuclear power plants are provided. The methods provide for removal of radioactive isotopes from a first portion of the contaminated stream, separated from the remaining portion of the stream, so that adsorbent used to purify the first portion of the contaminated stream by adsorption of the radioactive isotopes therefrom can be tested to determine the adsorbing efficacy of the generally larger portion of adsorbent used to purify the remaining portion of the stream.

18 Claims, 14 Drawing Figures

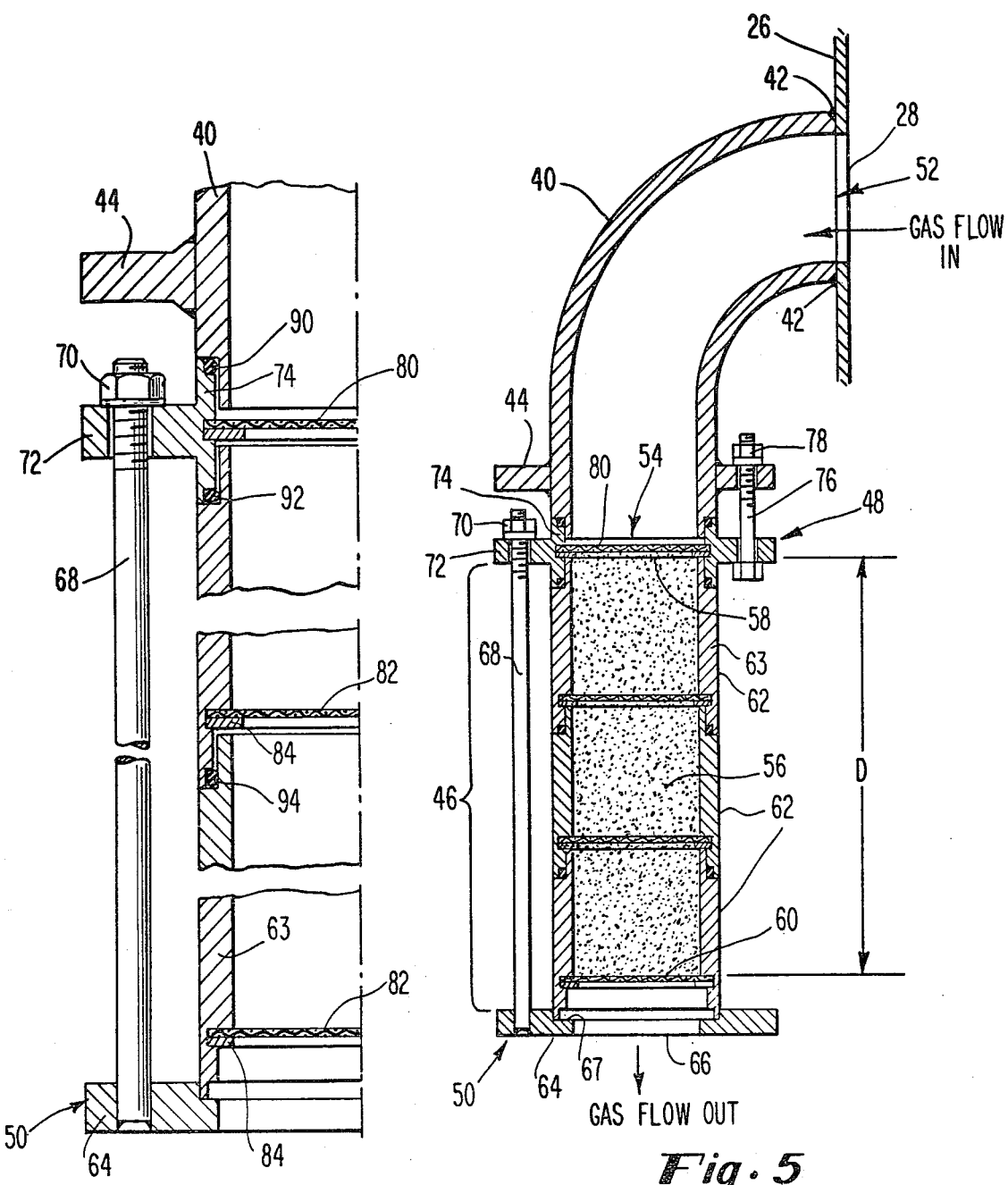
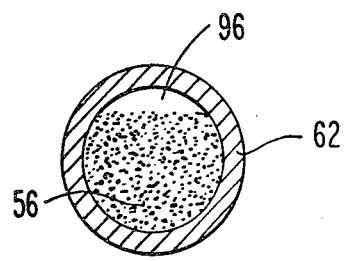
Fig. 5
Fig. 6
Fig. 7

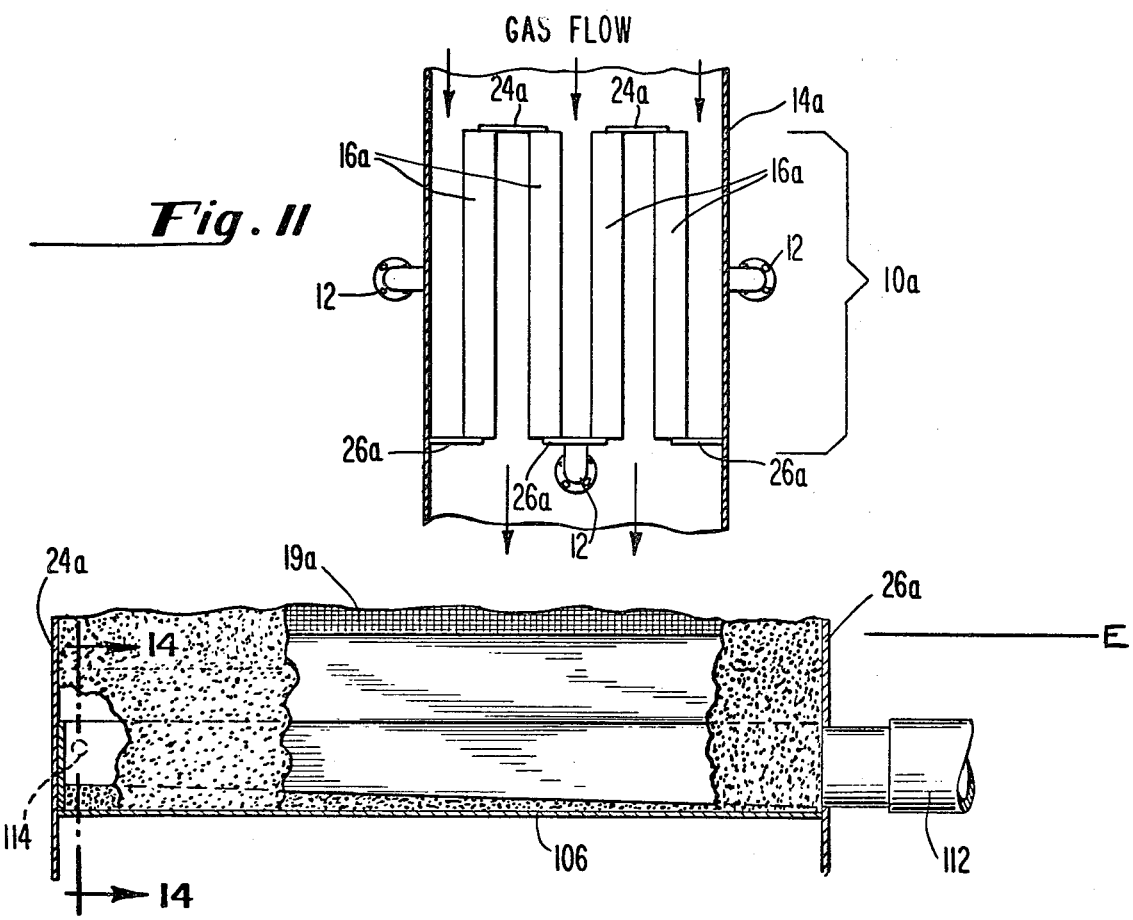
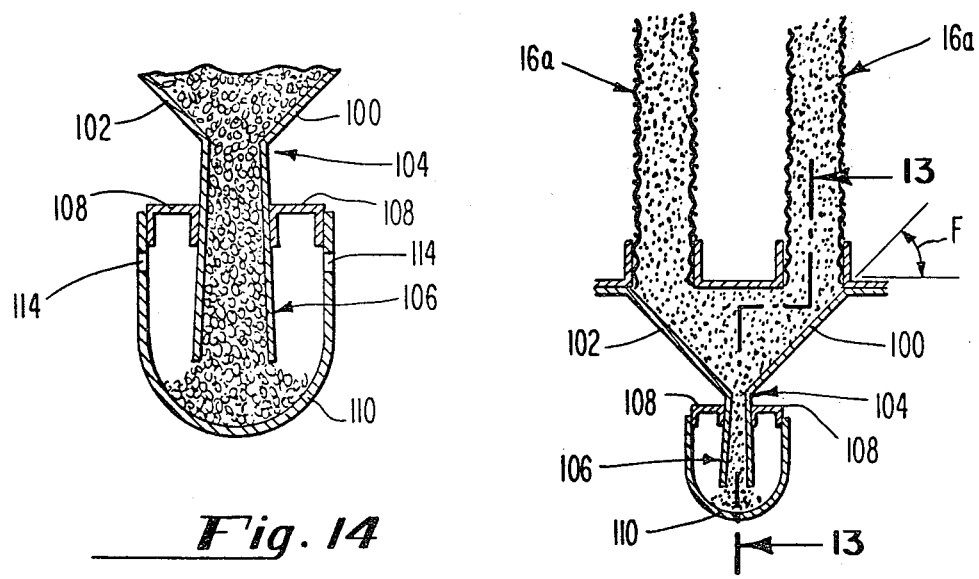

METHODS FOR REMOVING RADIOACTIVE ISOTOPES FROM CONTAMINATED STREAMS

CROSS REFERENCE TO RELATED PATENT APPLICATION

This patent application is a continuation-in-part of copending patent application U.S. Ser. No. 640,108, "Gas Purifier Having Rechargeable Adsorber Filter with Removeable Rechargeable Sample Canister," filed Dec. 11, 1975.

BACKGROUND OF THE INVENTION

Field of the Invention

The present invention is in the field of gas purification and is even more particularly in the field of methods for removal of radioactive isotopes from gas streams.

SUMMARY OF THE INVENTION

Heretofore, it has not been known to remove radioactive isotopes from contaminated gas streams by passing a first generally smaller portion of the stream, preferably vertically, through a generally small portion of sample adsorbent, thereby removing radioactive isotopes from that portion of the stream, while vertically dividing at least the remaining portion of the stream and then passing the remaining, generally larger portion of the stream laterally through a generally larger vertically oriented portion of adsorbent, thereby removing radioactive isotopes from that remaining portion of the stream, so the generally small portion of adsorbent used to purify the first portion of the stream can be tested to determine the adsorbing efficacy of the generally larger portion of adsorbent used to purify the remaining portion of the stream.

In accordance with the foregoing, it is a principal object of the present invention to provide methods for removing radioactive isotopes from gas streams which provide for isotope removal by two separate quantities of adsorbent.

It is a further object of the present invention to provide methods for removal of radioactive isotopes from gas streams where one quantity of adsorbent is substantially larger than the other quantity.

It is a further object of the present invention to provide methods for removal of radioactive isotopes from gas streams where smaller quantities of adsorbent may be used as samples to monitor the adsorbing efficacy of one or more remaining, larger quantities of adsorbent.

It is a further object of the present invention to provide methods for removal of radioactive isotopes from gas streams which permit periodic testing of adsorbent material in such a way as to comply with NRC Regulatory Guide 1.52.

These and other objects of the present invention will be apparent to those of ordinary skill in the art from an inspection of the attached drawing figures and from a reading of the following specification and appended claims.

The present invention, in the preferred embodiment, solves the problems present in the prior art by providing methods for removal of radioactive isotopes from contaminated gas streams wherein a portion of the gas stream is channeled through one or more first generally smaller portions of adsorbent material, each representative of a larger remaining portion of adsorbent material, which first generally smaller portions may be sampled periodically to determine remaining adsorbing efficacy of the larger remaining portion of adsorbent.

BRIEF DESCRIPTION OF THE DRAWINGS

FIG. 5 is a side sectional view of a sample canister taken along the lines and arrows 5—5 of FIG. 1.

FIG. 6 is a broken half sectional view of a sample canister showing in detail the means by which the sample canister is assembled.

FIG. 7 is a top sectional view of a sample canister which has been installed in an undesirable mode in combination with an adsorber, showing adsorbent which has settled and hence will allow undesirable channeling effects when gas passes through the sample canister. Preferable installation is shown in FIGS. 1, 4 and 5.

FIG. 11 is a top view of another embodiment of a gas purifier, with three sample canisters installed thereon and with the housing portion of the adsorber broken away to reveal the configuration of the filter beds therein.

FIG. 12 is a partial broken sectional end view of the bottom portion of two filter beds of the gas purifier shown in FIG. 11.

FIG. 13. is a broken partially sectioned side view of the bottom portion of the filter beds shown in FIG. 12.

FIG. 14 is a sectional view of the bottom portion of a means for emptying the filter beds of adsorbent taken along the lines and arrows 14—14 in FIG. 13.

In the drawings, identical numbers represent parts having identical or substantially similar names and functions while lower case alphabetic letters denote different embodiments.

DESCRIPTION OF THE PREFERRED EMBODIMENTS

Figure 1:
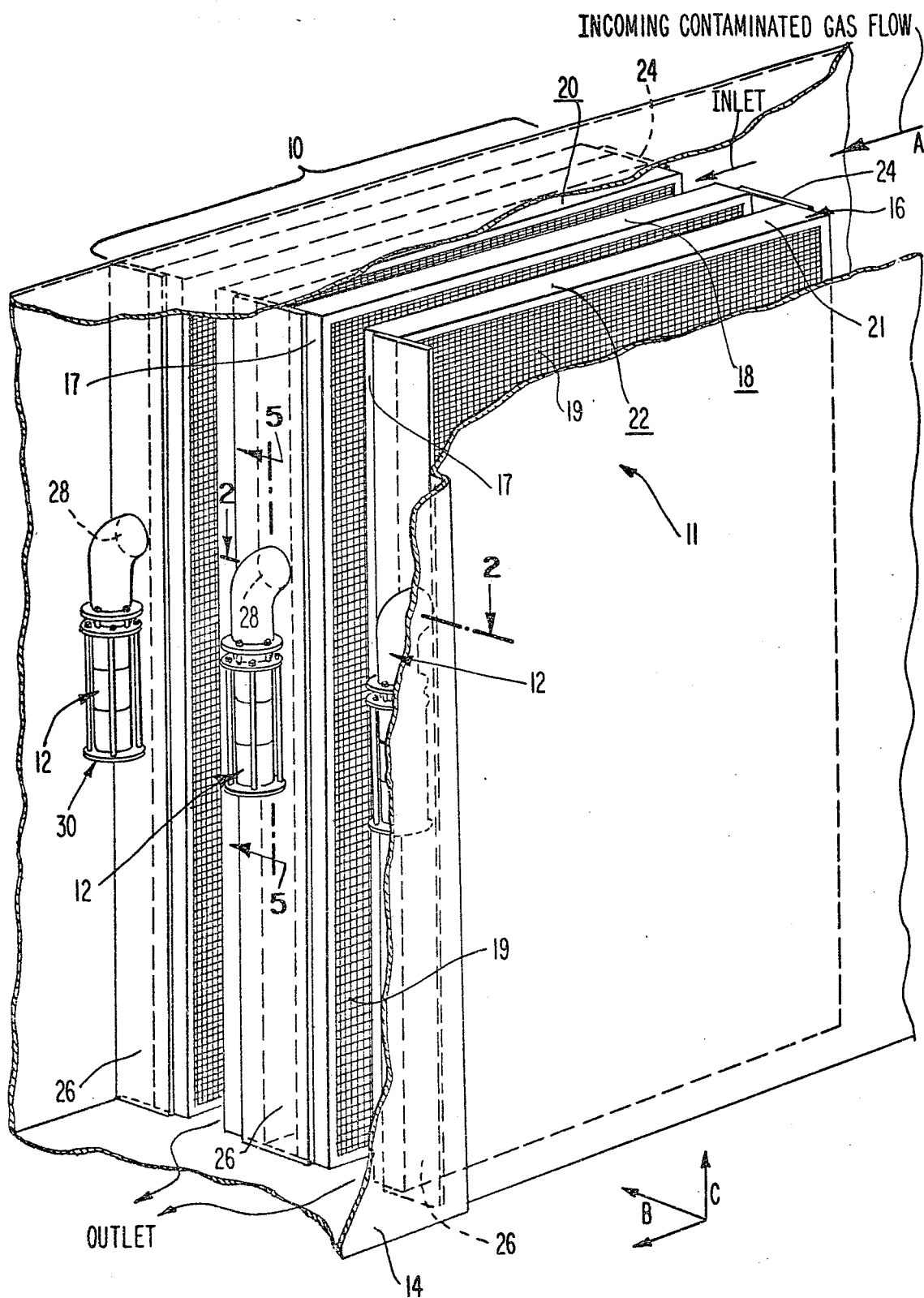
FIG. 1 is an isometric view of a gas purifier, with the gas ducting broken away to show three sample canisters installed on the adsorber to expose sample adsorbent contained in the sample canisters to the same flow conditions experienced by adsorbent in the adsorber.

Reference is now made to FIG. 1 which illustrates a gas purifier having three sample canisters for containment of adsorbent material in combination with an adsorber designated generally by horizontal bracket 10. The sample canisters have been designated generally as 12. Adsorber 10 has as a part thereof a housing means or duct 14. Duct 14 channels air or some other contaminated gas containing radioactive isotopes into filter portion 11 of adsorber 10 with flow of incoming air or gas denoted by arrow A. Incoming and outgoing gas flows are preferably parallel, along a line parallel to arrow A. This is referred to herein as a longitudinal direction. Lines, structures and gas flows perpendicular to the longitudinal direction, parallel to reference arrow B, are referred to as being in the lateral or transverse direction while lines, structures and gas flows parallel to reference arrow C are referred to as being in the vertical direction. Duct 14 is closed around filter portion 11 of adsorber 10 and is broken away in FIG. 1 to show sample canisters 12 in combination with adsorber 10.

Incoming contaminated gas initially passes into areas between preferably laterally or horizontally spaced preferably vertically oriented preferably parallel adsorbent filter beds 16. Each spaced adsorbent filter bed 16 consists substantially of a parallelepiped or hexahedron-shaped structure, having two preferably vertical solid side walls 17, one proximate the inlet and the other proximate the outlet of housing 14, and two preferably vertical perforate side walls 19 of screen or mesh-type material. The parallelepiped or hexahedron-shaped filter bed is preferably either a right parallelepiped or a right hexahedron. Means are provided at each bed's preferably horizontal top walls for respectively filling and emptying the beds. These means are not shown, to aid the clarity of the drawing. Any suitable means, such as doors, hatches, etc. may be used for access to the filter beds to fill the beds with adsorbent and to drain adsorbent therefrom. See U.S. Pat. No. 3,964,890 for an exemplary embodiment of emptying means at the bottom of the filter beds. Filter beds 16 preferably are substantially identical one to another. Individual spaced particulate adsorbent filter beds of adsorber 10 have been designated 18, 20 and 22.

The adjective "particulate", when used in describing a filter bed, modifies, either implicitly or explicitly, the word "adsorbent". Specifically, when adsorber 10 is operative, filter beds 18, 20 and 22, sometimes called cells, must be filled with granular or particulate adsorbent material. In this context the words "granular" and "particulate" are used interchangeably.

The adsorbent material adsorbs radioactive isotopes and other radioactive gaseous impurities from the gas stream passing through the gas purifier. Only incidentally will particles or particulate matter be filtered out of the gas stream; this would occur if particulate matter became lodged in the perforate walls or screens of the filter beds, or became lodged in the interstices between granules of adsorbent in the filter beds or was too large to pass through the perforate walls or screens of the filter beds. Normally such particles or particulate matter are filtered from the gas stream by "particulate filters" located in ductwork upstream from the gas purifier. See referenced copending application Ser. No. 563,768 for an exemplary embodiment of pariculate filters located upstream of the gas purifier. Consequently, in normal operation no particulate matter will be in the contaminated gas stream when the reaches the gas purifier.

Adsorbent material is contained within the filter beds. Gas passes through an adsorbent filter bed in the adsorber by passing through an inlet wall of the two perforate walls, then substantially laterally through the adsorbent material contained in the bed and out of the bed through an outlet perforate wall.

Alternate spaces between preferably parallel preferably vertically oriented filter beds are blocked at the inlet and at the outlet. Contaminated gas coming through one of the spaces between the spaced filter beds 16 at the inlet, such as the space between bed 18 and bed 20, must pass through either bed 18 or bed 20 to exit from adsorber 10 through one of the outlets between beds, at the left hand portion of FIG. 1. This pattern of gas flow is illustrated by curved lines denoting flow of gas in FIG. 2. Duct or housing 14 fits tightly around adsorber 10; the connections between housing 14 and adsorber 10 are preferably continuously welded to prevent any gas leakage. No gas can pass around adsorber 10 while traveling through duct 14; it must pass through adsorbent contained in spaced filter beds 16 or through one of sample canisters 12.

Sample canisters 12 facilitate determination of remaining adsorbing or filtering efficacy of adsorbent material in adsorber 10. A plurality of sample canisters normally are used in combination with a single adsorber to facilitate determination, at discrete time intervals, of the filtering efficacy of adsorbent material in the filter. Conventionally, the adsorber and sample canisters are filled with adsorbent material when the gas purifier is first installed. The efficiency of this material as an adsorbent decreases with time and decreases at an accelerating rate when the system is tested or placed in operation. When the adsorbing or filtering efficacy of the adsorbent material falls below a predetermined level, old adsorbent material in the adsorber filter must be replaced with virgin adsorbent material.

Figure 9:
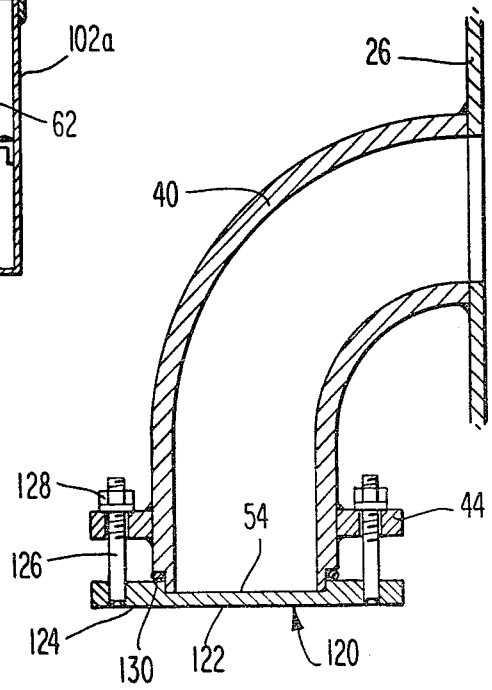
FIG. 9 is a side sectional view of a channeling means portion of a sample canister with a cover attached to the channel thereby sealing the outlet end of the channel.

For periodic testing of the adsorbing or filtering efficacy characteristic of the adsorbent material, the adsorber is equipped with a number of sample canisters. One preferable arrangement is shown in FIG. 1. Periodically one or more containment means portions of the sample canisters are removed from a channel means portion of the canister for testing the sample granular adsorbent contained therein. When the containment means portion is removed from the channel means, the channel from the adsorber is sealed with a cover to prevent escape of gas from the adsorber. The sealed configuration of the sample canister is illustrated in FIG. 9.

Once the filtering efficacy of adsorbent material in the adsorber has reached a level where adsorbent material in the adsorber must be replaced, the seals or covers are removed from the channels whereupon the containment means portions of sample canisters 12 are filled with fresh adsorbent material and reconnected to adsorber 10.

Still referring to FIG. 1, sample canisters 12 preferably are attached to outlet end blocking plates 26 by curved channeling means having passages therethrough with inlet and outlet ends. Consequently gas flows into a sample canister through hole 28 in outlet blocking plate 26 and through sample canister 12. Gas exits from the sample canister through a hole at the bottom surface thereof denoted 30 in FIG. 1.

Figure 2:
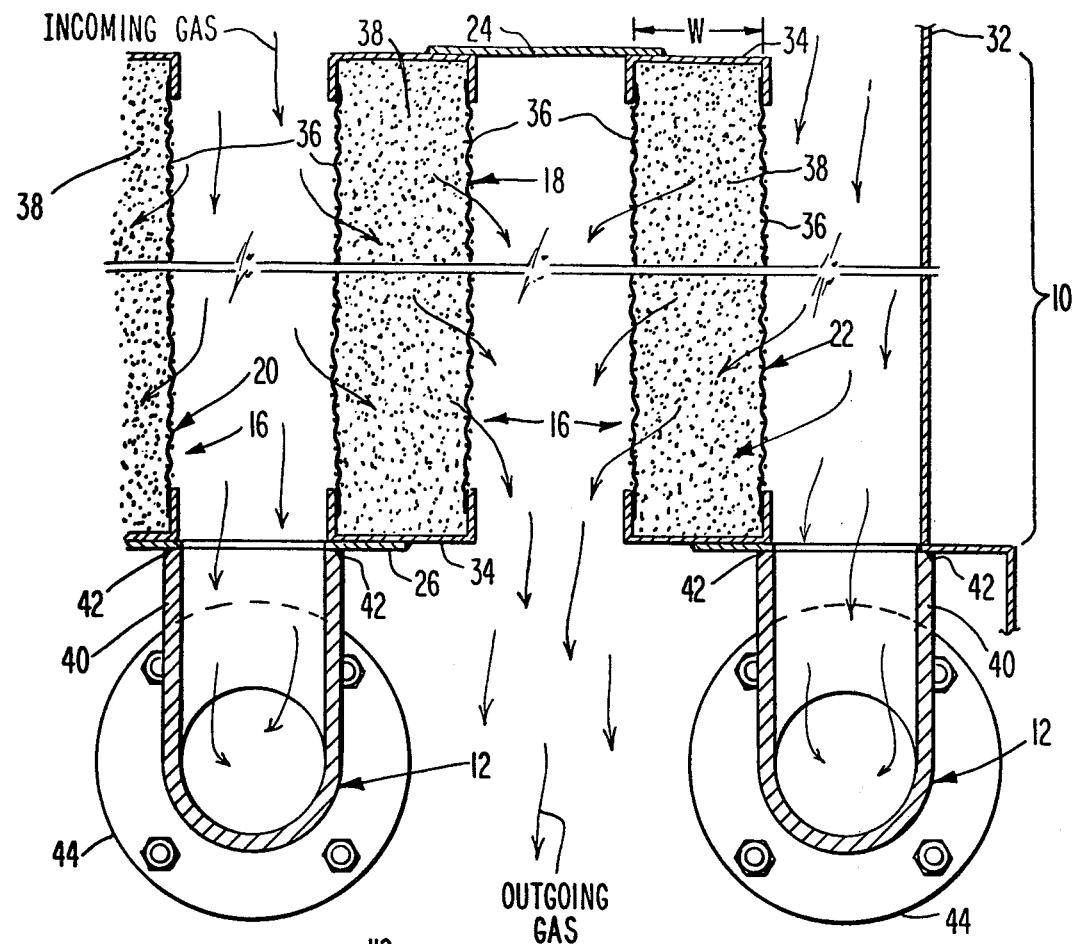
FIG. 2 is a partial broken sectional view of a portion of the gas purifier shown in FIG. 1, taken along the lines and arrows 2—2 in FIG. 1, with two sample canisters shown in section.

Reference is made to FIG. 2, where the gas flow pattern through the adsorber and sample canisters is shown by curved arrows. Again visible are inlet and outlet blocking plates 24 and 26. A side wall of the duct or housing, which also can comprise a side wall of the filter depending on the configuration of the filter, is denoted 32, with filter beds 16 shown having vertical solid side walls 34 and perforate screen or mesh portions 36. Beds 16 contain adsorbent material 38. Most contaminated gas entering adsorber 10 passes through the perforate screen or mesh portions of adsorbent filter beds 18, 20 and 22, through adsorbent material contained therein and outward in the direction shown. However, small portions of the gas, rather than flowing through filter beds 16, pass through the sample canisters 12. Each sample canister 12 is designed so that flow resistance encountered by entering gas is substantially the same as encountered by gas upon passing through a filter bed 16. Gas velocity through the sample canisters is consequently substantially the same as gas velocity through a filter bed. Thus sample adsorbent material contained in a sample canister 12 is exposed to substantially the same flow conditions as adsorbent contained in the individual adsorbent filter beds 18, 20 and 22. Consequently, tests of adsorbent in sample canisters 12 provide accurate data as to the degree adsorbent material in filter beds 18, 20 and 22 remains effective as an adsorbent.

For meaningful tests determining the filtering efficacy of sample adsorbent in a sample canister, the sample adsorbent material must be exposed to the same gas flow conditions as experienced by adsorbent material in the adsorber. Specifically, flow conductance through adsorbent material in the sample canister must be substantially the same as flow conductance through adsorbent material in the adsorber and the corresponding static pressure drop across a sample canister must be substantially the same as the corresponding static pressure drop across a thickness of adsorbent material having gas flow therethrough in the adsorber. Flow conductance is the gas flow rate per unit pressure drop and is conventionally expressed in units of cubic feet of gas per minute per inch of water pressure drop. Flow conductance is not a measured parameter but is computed from data measured for gas flow rate into a filter bed or sample canister and from corresponding static pressure drop data measured across the filter bed or sample canister. Static pressure drop is, of course, a measured parameter. Flow conductance and static pressure drop are primarily function of adsorbent packing density and the distance gas flows through the adsorbent. Extensive study, design and testing of gas purifiers such as the ones illustrated herein have resulted in designs which through demonstration testing have proved to produce flow through the sample canisters representative of flow through the adsorber filter beds. This has been achieved by equalizing flow conductance through and simultaneous static pressure drop accross the sample canisters and the filter beds.

Still referring to FIG. 2, channeling means portion 40 of sample canister 12, which is a means for directing gas entering adsorber 10 into the sample canister, is preferably secured to adsorber 10 by seal weld 42. However, any suitable gastight means may be used to secure the channeling means to the adsorber. Welding is a particularly suitable technique when the channel means and the adsorber are steel since it results in a gastight connection between the adsorber and the sample canister. This is required so contaminated radioactive gas coming into the adsorber cannot escape without passing through adsorbent material in either the beds or the sample canisters.

Also visible in FIG. 2 is external flange portion 44 of channel means 40, disposed circumferentially around channel means 40 at its outlet end. External flange portion 44 works in conjunction with a connection means to connect the channel means to a containment means portion of the sample canister when the sample canister is in an assembled condition. This connection is described in more detail below.

FIG. 5 is a sectional view of a sample canister. Channeling means 40 extends outwardly and preferably curved downwardly preferably from outlet blocking plate 26 of the adsorber and is attached thereto by welds 42. Gas enters the sample canister through hole 28 in outlet blocking plate 26 and travels through the passageway in channeling means 40 to the containment means designated by vertical bracket 46. Containment means 46 is connected to channeling means 40 by connection means 48. Channeling means 40 has inlet end 52 and outlet end 54 for flow of gas therethrough. Gas entering channeling means 40 passes therethrough, then through containment means 46 and around and through sample granular adsorbent material 56 therein, through an outlet end of containment means 46 and through a hole in retention means 50, as per the arrows and legend in FIG. 5.

Containment means 46 has inlet end 58 and outlet end 60, and may be a single structure containing sample adsorbent therein or may be comprised of one or more preferably interchangeable containment means segments, depending on the thickness of the filter beds. As illustrated, containment means 46 comprises a plurality of interchangeable containment means segments 62, each having an inlet end and an outlet end, where the inlet end of each segment is connectable either to connection means 48 or to the outlet end of another containment means segment. Each containment means segment has a passage therethrough for containing sample adsorbent 56.

Containment means 46, whether comprised of a single structure or a plurality of containment means segments 62 connected together seriatum as in FIG. 5, is retained against connection means 48 by retention means 50. Retention means 50 preferably consists of ring-like structure 64 having hole 66 therethrough of substantially the same shape and cross-sectional area as the passage through containment means 46. Ring-like structure 64 preferably has at least one partially threaded rod 68 extending therefrom. Partially threaded rod 68 extends sufficiently far from ring-like structure 64 to extend through external flange portion 72 of connection means 48. A nut 70 in threaded engagement with rod 68 secures ring-like structure 64 of retention means 50 tightly against containment means 46 and secures the containment means securely against connection means 48. Hole 66 in retention ring 64 has continuous circumferential notch 67 therein of inside diameter only slightly larger than the outside diameter of containment means 46 whereby containment means 46 fits tightly into the notch when retention means 50 is placed in engagement with connection means 48.

Connection means 48 has ring-like structure 74 with a hole in the center of substantially the same size and shape as the passage through channel means 40. Extending circumferentially around ring-like structure 74 is external flange portion 72 of connection means 48; this external flange has at least two holes therethrough. At least one of those holes is for passage therethrough of rod means portion 68 of retention means 50; another one of the holes is for passage therethrough of bolt 76. Bolt 76, when passed through one of the holes in external flange portion 72 and tightened in threaded engagement with nut 78, provides, in combination with nut 78, means for retaining connection means 48 in tight engagement with channeling means 40. Accordingly, when retention means 50 retains containment means 46 against connection means 48 by nut 70 on partially threaded rod 68 having been tightened against flange portion 72, and when bolt 76 passes through flange portion 72 of connection means 48 and flange portion 44 of channeling means 40 and is tightened in threaded engagement with nut 78, the retention means, the containment means, the connection means and the channeling means are retained tightly together.

Adsorbent material is maintained in the containment means by external wall 63 of containment means 46 and by screens or meshes. One screen or mesh 80 is disposed across the passageway through ring-like structure 74 of connection means 48. Screen 80 is retained in connection means 48 by a retaining ring snapped into a circumferential groove around the inside surface of the hole in the ring-like structure of the connection means. Some of these items are not numbered in FIG. 5 to aid the clarity of the drawing. A screen at the other end of containment means 46 serves to retain adsorbent therein. Where the containment means comprises a plurality of interchangeable containment means segments, as in FIG. 5, each segment preferably has a screen associated therewith. Where the containment means comprises only a single structure or only one of a plurality of identical interchangeable segments, a screen, such as shown at outlet end 60 of the containment means in FIG. 5, serves to retain adsorbent material 56 in the containment means.

Figure 8:
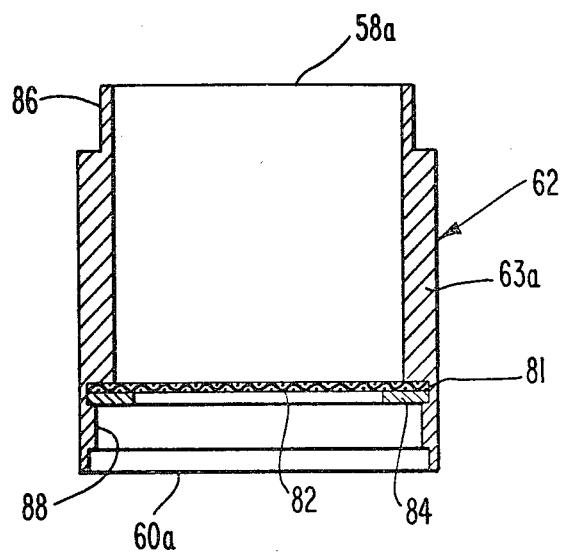
FIG. 8 is a side sectional view of a containment means segment portion of a sample canister, with the section taken as indicated by the lines and arrows 5—5 in FIG. 1.

Reference is now made to FIG. 8. The individual containment means segment shown has inlet end 58a, outlet end 60a and circumferential side wall 63a. Around the surface of the passageway through the containment means segment is circumferential notch 81 is which screen or mesh means 82 is fitted. The screen or mesh is retained by retaining ring 84 snapped into place. Shoulder 86 fits into notch 88 of another identical containment means segment or into a connection means. Shoulder 86 is preferably at a first or inlet end of the containment means segment and notch 88 is preferably at a second or outlet end of the containment means segment. Mesh means 82 is of a suitably small mesh size to retain sample adsorbent material within the containment means segment.

The sample canister can be assembled utilizing any number of containment means segments to form the containment means with the number of containment means segments employed dictated by the minimum thickness of adsorbent in the filter beds 16. When the sample canister is assembled, the shortest path contaminated gas can take through the sample adsorbent material in the containment means is, when considering the sample canister in FIG. 5, a vertical straight line path of length D down through the containment means segments. To make the shortest path for gas travel through the adsorbent material in the sample canister the same length or slightly less in length than the shortest path for gas travel through adsorbent material in the adsorber, the sample canister is constructed with dimension D in FIG. 5 equal to or slightly less than dimension W in FIG. 2. By way of example and not by way of limitation, if W is 6 inches, the sample canister might be constructed with each containment means segment of length 2 inches or just slightly less than 2 inches. When three containment means segments were used to form the containment means, dimension D in FIG. 5 would be 6 inches or just slightly less and dimensions D and W would substantially be equal. In such case, the containment means could also be constructed as a single unified structure, having a length of 6 inches or just slightly less.

The foregoing examples and dimensional figures are given for purposes of illustration only. However, common to all examples and embodiments is the principle of making the shortest path contaminated gas can take through sample adsorbent contained in the sample canister equal to or less than the shortest path contaminated gas can take through adsorbent in the filter beds of the adsorber.

Again referring to FIG. 5, the three containment means segments 62 of FIG. 8 have been fitted together to form a single containment means 46. Each containment means segment 62 has a mesh means therein disposed close to the outlet. Accordingly, the four mesh means shown in FIG. 5, one associated with each of the three containment means segments 46 and one associated with connection means 48, form three discrete compartments in the containment means for sample adsorbent exposed to gas flow.

Reference is made to FIG. 6. Again visible are external side walls 63 of the containment means, retention means 50 with ring-like structure 64 and partially threaded rod 68 extending therefrom, external flange 72 of the connection means, external flange 44 of the chaneling means, all substantially as in FIG. 5 and numbered correspondingly. First gasket means 90 is disposed between the channeling means and the connection means for affecting a substantially airtight seal therebetween. Second gasket means 92 disposed between the containment means and the connection means affects a substantially airtight seal therebetween. Similar gasket means 94 between adjoining containment means segments affect substantially airtight seals therebetween when a plurality of containment means segments are used to form the containment means.

The gasket means provide assurance that any contaminated gas flowing through the sample canister must pass through the entire sample canister and contact a predetermined amount of sample adsorbent. The contaminated gas cannot leak from the sample canister at the junction of the containment means and the connection means, or at the junction of the connection means and the channeling means or at any junction of two containment means segments. Also clearly shown in FIG. 6 are mesh means 82 and retaining ring means 84 associated with each containment means segment and mesh means 80 and retaining ring means 79 associated with the connection means. The mesh means and the retaining ring means fit into circumferential grooves around the inside of the containment means segments and the connection means; retaining rings are snap-fitted into these circumferential grooves to retain the mesh means.

Although the sample canister shown in FIGS. 5 and 6 has but a single partially threaded rod 68 extending from flange portion 64 of retention means 50 and although FIG. 5 illustrates but a single nut 78 and bolt 76 in combination connecting external flange portion 72 of connection means 48 to external flange portion 44 of channeling means 40, any number of threaded rod and nut combinations any any number of nut and bolt combinations may be used to connect the portions of the sample canister together. The number of such connecting elements is limited only by space available circumferentially around the sample canister. Likewise, although all the sample canisters illustrated have been shown having generally circular cross sections, the sample canisters need not have circular cross sections. A variety of configurations are possible.

The sample canister is preferably constructed with channeling means 40 generally having a curved, right angle disposition, with containment means 46 oriented vertically, either substantially straight up or straight down. This is to eliminate undesirable channeling effects which may occur if the containment means is not disposed vertically. These undesirable channeling effects occur if adsorbent in the containment means portion of the sample canister settles to one side as shown in FIG. 7. In FIG. 7 void 96 is a passageway through which gas could flow without substantially contacting adsorbent 56. If adsorbent in the sample canister illustrated in FIG. 7 were removed and tested to determine the efficacy of the adsorbent in the adsorber filter, the test results would be erroneous since the sample adsorbent would not have been exposed to the gas flow conditions experienced by adsorbent in the adsorber. If the containment means is always oriented vertically, undesirable channeling cannot occur and all gas passing through the containment means will pass through the adsorbent therein. Accordingly, test results will be valid.

Although a vertical orientation of the sample canisters is preferred, horizontal or skew orientations may also be used if provision is made to prevent settling of the adsorbent in the sample canister so channeling cannot occur. One structure which may be used to prevent channeling in a horizontally oriented canister is a trough or funnel-like structure extending the length of the horizontally disposed canister, having adsorbent material in the trough. With such a trough, as any setting occurs in the sample canister, adsorbent material will flow downward from the trough, into the main portion of the horizontally disposed canister, to fill any voids created by settling of adsorbent. This replacement adsorbent material thus prevents channeling.

Figure 4:
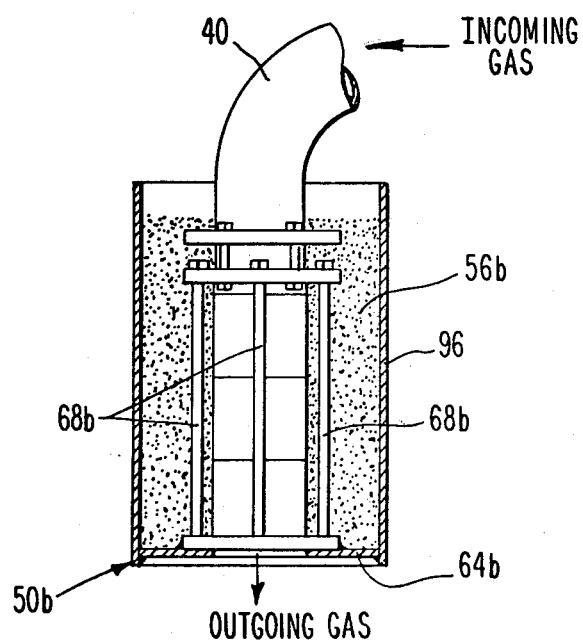
FIG. 4 is a partially sectioned side view of a second embodiment of a sample canister wherein there is provided a safety basket for the containment of additional adsorbent around the sample canister.

Reference is now made to FIG. 4 where an alternative embodiment of means for retaining the containment means against the connection means is shown. In this embodiment of the sample canister, ring-like structure 65b of the retention means has a larger diameter than in the embodiment shown in FIG. 5, so it extends further radially outward from the axis of symmetry of the containment means. Wall structure 96 extends perpendicularly from ring-like structure 64b, in the same direction as partially threaded rod 68b, a sufficient length to form a safety basket to surround the containment means, the connection means, and at least a portion of the channeling means. The wall structure or safety basket is filled with adsorbent 56b. This embodiment of the retention means not only serves to retain the containment means against the connection means but also provides an additional safety feature in that should any gas leak at the juncture of the channeling means and the connection means or at the juncture of the connection means and the containment means or from between any of the containment means segments, such gas would have to pass through the additional adsorbent 56b contained by the wall structure of safety basket 96. Thus, additional purification of this gas would take place thereby providing an even greater margin of safety. When the retention means is configured forming the safety basket shown in FIG. 4, it is constructed such that it holds sufficient adsorbent 56b whereby the minimum distance leaking gas would have to travel through adsorbent material 56b contained by the safety basket is at least equal to the shortest path contaminated gas must travel through adsorbent material in the adsorber.

In the embodiment shown in FIG. 4, retention means 50b has been illustrated with three connecting rod means 68b in engagement with the connection means. At least two nut and bolt combinations connect the external flange portion of the connection means with the external flange portion of the channeling means. Some structural elements of the sample canister shown in FIG. 4 have not been numbered, where the elements are substantially the same as corresponding elements discussed previously, to aid the clarity of the drawing.

Figure 3:
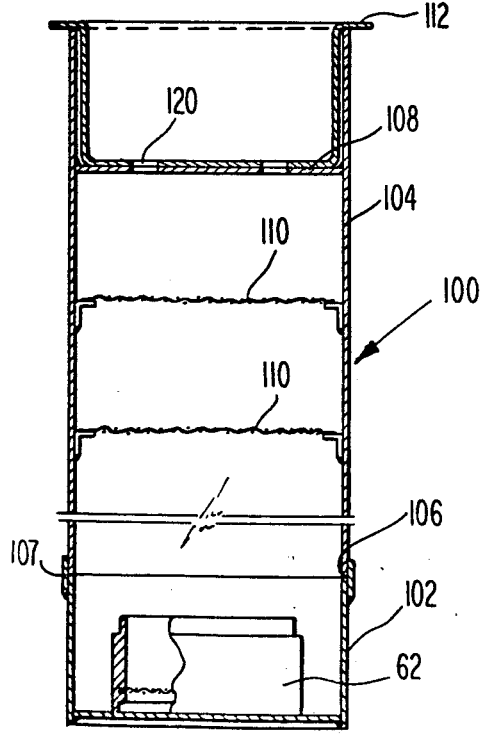
FIG. 3 is a side sectional broken view of apparatus for filling a sample canister with sample adsorbent, with a portion of a sample canister shown therein.

Reference is now made to FIG. 3 showing in broken sectional view a means 100 for filling the containment means or a containment means segment with sample adsorbent material. This means 100 for filling the containment means or a containment means segment with sample adsorbent comprises lower portion 102 and upper portion 104. These two portions are adapted for optional connection and separation at juncture 106. Lower portion 102 is a means for at least partially surrounding a containment means while the containment means is being filled with sample granular adsorbent. Upper portion 104 is a means for metering and distributing a flow of granular adsorbent when granular adsorbent is being filled into a containment means contained in lower portion 102 to which upper portion 104 is attached. An interference fit between the upper portion and the lower portion, with flange member 107 being attached to either the upper or lower portion, for force fitting with the remaining portion is preferred. Upper portion 104 has therein metering means 108 in the form of a plate having at least one hole for passage of adsorbent therethrough. Rotatable valve 112 fits slidably into a vertical extremity of upper portion 104 for rotational movement therewithin. Valve 112 has the same number of holes 120 as metering means 108 and the holes in each of these two members are the same size and oriented in the same manner. When valve 112 is turned to a first position, holes 120 in valve 112 are congruent with those of metering means 108 and adsorbent can pass through the holes into a containment means segment in lower portion 102. When valve 112 is turned to a second position, holes 120 are no longer congruent with those of metering means 108, but are blocked and no adsorbent can flow downward.

Upper portion 104 also has at least one mesh distribution means 110 for distributing sample adsorbent in a substantially uniform fashion. The mesh distribution means 110 are disposed below metering means 108. By placing adsorbent on rotatable valve 112 while it is in the first or open position, thereby allowing the adsorbent to fall through one or more of the mesh distribution means into a containment means or a containment means segment 62 such as is shown in position for filling in FIG. 3, a substantially uniformally packed density of adsorbent in the containment means or containment means segment results. This is required so gas flowing through the sample canister, when it is assembled, is exposed to substantially uniform flow conditions, no matter which portion of the containment means the gas flows through. The size of lower portion 102 is dictated by the size of the containment means to be filled. The size of the holes in valve means 112, and in plate or metering means 108 and the mesh size of mesh distribution means 110 are dictated by the size of the granules of adsorbent which is being packed into the sample canister. The mesh or hole size of mesh distribution means 110 is always sufficiently large to allow passage therethrough of granular adsorbent material, the mesh size being such as to affect uniform distribution of adsorbent flow through the mesh distribution means, across the area thereof. Contrasting, the mesh means portion 82 of the containment means and the mesh portion 80 of the connection means are of sufficiently small mesh size that no adsorbent granules can pass therethrough.

Reference is now made to FIG. 9 showing channeling means 40 of the sample canister with cover means 120 attached thereto for closing the channeling means so no gas can pass through. Cover means are utilized after sample adsorbent in the removeable containment means has been removed. Cover means 120 preferably consists of a solid center portion 122 adapted for tight contact with outlet 54 of channeling means 40. Skirt portion 124 extends outward radially from at least a portion of solid center portion 122 and preferably has one or more at least partially threaded rods 126 extending therefrom, for passage through holes in external flange portion 44 of channeling means 40. Third nuts 128 engage threaded rods 126 which extend from cover means 120. When third nuts 128 are tightly threaddedly engaged with threaded portions of rod means 126, cover means 120 is tightly retained against the outer end of channel means 40 and no gas can escape. Optionally, gasket means 130 may be used to provide even greater assurance of an airtight seal between cover means 120 and the outlet end of channeling means 40.

Figure 10:
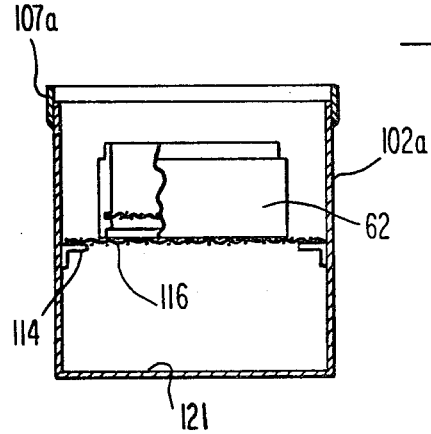
FIG. 10 is a side sectional broken view of a portion of a second embodiment of a bottom portion of a means for filling a portion of a sample canister with sample adsorbent, with a portion of a sample canister shown therein.

Reference is now made to FIG. 10 wherein there is shown a second embodiment of a bottom portion of means for filling a containment means or a containment means segment with adsorbent material. This bottom portion 102a is similar to that shown in FIG. 3, but has screen support portion 116, supported by bracket means 114, for supporting the containment means or a containment means segment 62 above base 121 of bottom portion 102a. Flange members 107a are provided so that bottom portion 102a may be force fitted together with an upper portion such as upper portion 104 shown in FIG. 3. The embodiment shown in FIG. 10 for bottom portion 102a allows the containment means segment to be filled with granular adsorbent while its top portion is maintained substantially above the level of excess granular adsorbent. This facilitates handling of the filled containment means segment without disturbing the granular adsorbent material packed therein. Lower portion 102a shown in FIG. 10 fits with upper portion 104 shown in FIG. 3 and may be used for filling either a single containment means segment or a large containment means. Screen support portion 116 has a sufficiently large mesh size such that granular adsorbent which does not enter the containment means resting thereon passes through the screen means and accumulates on base 121. No adsorbent accumulates on screen support means 116.

For the sample canister it is preferred that the inside diameter of the channel means, the inside diameter of the ring-like portion of the connection means, the inside diameter of the containment means or the containment means segments and the diameter of the large hole in the retention means are all substantially the same so gas flow through these elements is at substantially constant velocity. Also, the connecting rods, bolts and nuts shown are merely illustrative and any configuration of threaded rods, nuts and bolts or any other fastening means could be used to secure together the component parts of the sample canister.

Any suitable particulate material which adsorbs radioactive contaminants, and which particularly adsorbs radioactive isotopes of iodine, may be used as the adsorbent. Such materials include, for example, activated carbon. The activated carbon adsorbent may be made from coal, coconut shell, petroleum, wood or any other suitable base; coconut shell is the preferred base. The activated carbon adsorbent may be impregnated with potassium iodide, elemental iodine, triethylene diamine, lead or other metals with potassium iodide being the preferred impregnate. Also, silver zeolite, and other adsorbing metals and metal compounds may be used as adsorbents. These metals may be impregnated with silver or other metallic cations when used as adsorbents.

As noted, for tests to determine the filtering efficacy of the adsorbent to be meaningful, the sample adsorbent material must be exposed to the same gas flow conditions as the adsorbent material in the adsorber. Particularly, since flow conductance and pressure drop are functions of granular adsorbent material packing density and gas flow distance through the adsorbent material, these two parameters must be controlled so both are substantially the same in the sample canister and in the filter beds.

The means for filling the containment means or a containment means segment with sample adsorbent material shown in FIG. 3 and in FIG. 10, when utilized, produce a packing density of sample adsorbent material in the containment means which is uniform and repeatable on successive trials. Furthermore, use of these means for filling the sample canister containment means segments with adsorbent results in a packing density in the sample canister substantially the same as the packing density in the adsorber when the adsorber filter beds are filled with adsorbent material using the apparatus described and claimed in referenced U.S. Pat. No. 4,030,639, Charcoal Adsorber Filter Fill System. Accordingly, one of the two parameters for obtaining equal flow conductance through the sample canister and the filter beds of the adsorber has been shown to be controllable and repeatable. When the packing density of granular adsorbent is the same in the filter beds and the sample canister, if the distances gas travels through adsorbent in the adsorber filter beds and through the sample canister are equal, flow conductance through the adsorber and through the sample canister will be the same. Clearly these distances can be controlled by design as described above with reference to FIG. 2 and FIG. 5. Specifically, in the embodiment shown in FIG. 2 and FIG. 5, if dimension D is the same as dimension W, the minimum gas flow distance through adsorbent material will be the same in the sample canister and in the adsorber bed.

Referring to the sample canister embodiment illustrated in FIG. 5, a slight gap will necessarily exist between the upper most extremity of adsorbent in a given canister means segment and the screen or mesh means portion of the canister means segment or the connection means immediately thereabove, due to manufacturing tolerances. Accordingly, speaking in the strictest sense, when dimensions D and W are equalized dimension D in the embodiment illustrated in FIG. 5 is actually the sum of the shortest distances through the adsorbent in each canister means segment. In any event, the principle of making the shortest possible gas flow distance through adsorbent in the sample canister the same or just slightly less than the shortest possible gas flow distance through adsorbent in a filter bed remains unchanged.

The containment means containing adsorbent material is constructed in one exemplary embodiment with dimensions such that minimum gas flow distance therethrough is slightly shorter than minimum gas flow distance through an adsorber filter bed. This produces a slightly higher flow conductance per unit area through the sample canister than through the filter bed. The corresponding static pressure drop is slightly lower across the sample canister than across the filter bed. Hence adsorbent material in a sample canister receives a slightly greater flow of gas, per unit area facing gas flow, than does adsorbent material in an adsorber filter bed. Thus adsorbent material in the sample canister is exposed to slightly more gas than is adsorbent material in the adsorber filter beds. Therefore the sample adsorbent loses its adsorbing efficacy slightly faster than does the adsorbent material in the adsorber filter beds and when a test of sample canister adsorbent material indicates that its adsorbing efficacy is nearly depleted, there is assurance that adsorbent material in the adsorber filter beds has somewhat more adsorbing efficacy remaining. This means that for this exemplary embodiment "worst case" conditions are always experienced by adsorbent material in the sample canister and a margin of safety is provided for the adsorbent in the adsorber filter beds.

The adsorber filter system illustrated has been constructed with the filter bed having width W in FIG. 2 of 2 and ⅛ inches. The sample canister designed for use with this bed has a containment means of length 2 inches with machine tolerances of −0.00 inches +0.05 inches. Thus the containment means has a slightly shorter minimum distance for gas flow therethrough (dimension D in FIG. 5) than the minimum distance for gas flow through the adsorber filter bed (dimension W in FIG. 2).

So long as flow conductance and corresponding static pressure drop experienced by gas passing through the containment means of the sample canister is substantially the same as flow conductance and corresponding static pressure drop experienced by gas passing through an adsorber bed, the sample canister portion of the gas purifier can be mounted anywhere on or in connection with the adsorber filter so long as the sample canister is not disposed for flow therethrough of gas which has already passed through the filter beds of the adsorber. Thus, with reference to FIGS. 1 and 11, the sample canister could be mounted outside duct 14 as shown in FIG. 11, or even upstream of the filter beds, perhaps attached to inlet blocking plates 24a. A preferred attachment orientation and position is that shown in FIG. 1, however, any suitable attachment position and sample canister orientation may be used so long as the sample canister is exposed to the proper contaminated gas flow and is disposed such that the flow conductance per unit face area exposed to gas flow across the canister is at least as great as the flow conductance per unit face area exposed to gas flow across one adsorber filter bed and the static pressure drop, corresponding to the flow conductance, across the sample canister is no greater than the static pressure drop, corresponding to the flow conductance, across the adsorber filter bed.

In the preferred embodiment of the process, when one or more sample canisters are in positions shown in FIGS. 1 and 2, the entire gas stream is fed in the longitudinal direction through closed duct 14 to adsorber 10. The gas stream is then preferably divided into a plurality of substantially horizontally flowing substreams, with division being preferably along substantially vertical lines preferably defined by inlet blocking plates 24. At least a major portion, i.e. the majority of each substream, then flows preferably substantially laterally preferably through at least one preferably substantially vertically oriented adsorbent bed, as illustrated in FIG. 2, while at least one minor portion of at least one substream flows preferably substantially vertically through sample adsorbent in sample canister 12 with each minor portion of each substream flowing through separate sample canisters. As major portions of the substreams pass preferably substantially laterally through adsorbent beds, radioactive isotopes are adsorbed from those major portions by adsorbent material in the adsorbent beds. Similarly, as minor portions of substreams pass preferably substantially vertically through sample canisters, radioactive isotopes are adsorbed from those minor portions of substreams by adsorbent material in the sample canisters.

As gas flows through the adsorber and is divided into substreams, where a major portion of the substream flows through at least one adsorbent bed and each minor portion of the substream flows through a separate sample canister, the major portion of at least one substream is preferably divided into subportions, preferably along a substantially vertical line preferably defined by an outlet blocking plate 26. A first subportion of any said substream flows preferably substantially horizontally, through a first preferably substantially vertically oriented bed of particulate adsorbent, such as bed 18, while the remaining subportion of said substream flows, preferably substantially horizontally, through a second preferably substantially vertically oriented bed of particulate adsorbent, such as bed 20.

With reference to FIG. 2, the substream in the leftmost open space, between beds 18 and 20, has a minor portion thereof flow from the open space through sample canister 12. The major portion of the substream is preferably divided into first and second subportions preferably by outlet blocking plate 26. Outlet blocking plate 26 directs one subportion of the major portion of the substream to flow through bed 18 and directs the remaining subportion of the major portion of the substream to flow through bed 20. The substream minor portion, which passes through sample adsorbent in sample canister 12, flows vertically through a vertical thickness of adsorbent no greater than width W of adsorbent in either bed 18 or bed 20. Preferably, the vertical thickness of adsorbent in sample canister 12 is slightly less than width W of adsorbent is beds 18 and 20. Adsorbent in sample canister 12 is packed at the same packing density as adsorbent in beds 18 and 20.

In an alternative embodiment of the process, a portion of the gas stream in duct 14 may be sampled upstream of adsorber 10 and the sampled portion of gas optionally may or may not be returned to the unsampled portion of the gas stream. In this alternative process, the entire gas stream initially flows through a closed duct such as duct 14. A portion of the gas stream is fed through sample adsorbent, preferably in a substantially vertical direction, whereupon radioactive isotopes are adsorbed from said portion. The remaining portion of the stream is divided, preferably along substantially vertical lines preferably defined by inlet blocking plates 24, into a plurality of preferably substantially horizontally flowing substreams. Each substream then flows preferably substantially laterally through at least one preferably substantially vertically oriented adsorbent bed.

Preferably, at least one substream is divided into subportions along substantially vertically oriented lines, preferably defined by outlet blocking plate 26. A first subportion of any said substream flows, preferably substantially horizontally, through a first preferably substantially vertically oriented bed of particulate adsorbent while the remaining subportion flows, preferably substantially horizontally, through a second preferably substantially vertically oriented bed of particulate adsorbent, whereupon radioactive isotopes are adsorbed from said subportions. The horizontal thickness of sample adsorbent, in the vertical direction in the sample canisters, is no greater than the thickness of adsorbent in a vertically oriented adsorbent bed in the direction of lateral gas flow therethrough. Preferably the vertical thickness of sample adsorbent in the sample canister is less than the lateral thickness of adsorbent in an adsorbent bed. The sample adsorbent in the sample canisters is packed at the same density as adsorbent in the adsorbent beds.

In this alternative embodiment of the process the portion of the gas stream which passes through the sample adsorbent may optionally be recombined with the remaining portion of the gas stream before that remaining portion is divided into a plurality of substreams for flow through the adsorber.

The process of the present invention has been practiced with 8 × 16 mesh activated carbon as the adsorbent material in the filter beds and sample canisters, with the adsorbent material in the beds and the sample canisters packed at the same density. The static pressure drop experienced by the gas passing through a filter bed or sample canister has ranged from about 0.8 inches of water to about 1.2 inches of water when the incoming superficial gas velocity has been about 40 feet per minute and when a 2 inch filter bed thickness and a 2 inch canister means length have been used.

Temperature of the incoming contaminated gas stream may range from about 20° C. to about 130° C. while the pressure of the incoming stream may range from about 1 atmosphere to about 5 atmospheres. A filter bed thickness as small as 2 inches or as great as 8 inches with a corresponding canister means length may be used. The relative humidity of the incoming gas stream preferably should be less than 95 percent. The stream air velocity may range from a low of about 20 feet per minute to a high of about 60 feet per minute.

Although the process of the present invention has been described with reference to various embodiments of apparatus disclosed and claimed in copending U.S. patent application Ser. No. 640,108, the parent case hereto, the methods of the present invention are not limited to practice using the disclosed apparatus. The methods of the present invention are defined by the claims appended hereto. Many different configurations of apparatus are possible for practicing the methods claimed herein.

The invention being thus described, we claim the following:

1. A method for removing radioactive isotopes from a contaminated gas stream comprising the steps of:
   (a) feeding the entire gas stream through a closed duct;
   (b) dividing said stream along vertical lines into a plurality of horizontally flowing substreams;
   (c) forcing at least a major portion of each substream horizontally through free-standing uncompressed particulate granular adsorbent material contained in a vertically upstanding adsorbent bed within said duct wherein radioactive isotopes are adsorbed, to a position downstream of a sample canister;
   (d) diverting a minor portion of at least one horizontally flowing substream from the substream major portion, prior to substream flow through said vertically upstanding adsorbent bed, into a curvilinear conduit for changing direction of flow of said minor portion from horizontal to vertical;
   (e) vertically flowing said diverted minor portion through a free-standing uncompressed column of sample particulate granular adsorbent material contained in a sample canister, wherein radioactive contaminants are adsorbed from said diverted minor portion, to a position downstream said vertically upstanding bed;
   (f) combining said major portions and said minor portions of all said streams into a single stream;
wherein all gas flow through adsorbent material in a sample canister is vertical.

2. The method of claim 1 wherein said upstanding adsorbent bed is configured as a parallelepiped having two spaced parallel perforate surfaces for gas flow therethrough and said sample canister is configured as a vertically oriented cylinder.

3. The method of claim 1 wherein step (c) further comprises the simultaneously performed substeps of forcing a first subportion of the major portion of at least one substream horizontally through a first vertically oriented bed of free-standing uncompressed particulate granular adsorbent material and forcing a remaining subportion of said major portion of said substream horizontally through a second vertically oriented bed of said free-standing uncompressed particulate granular adsorbent material, said first and second vertically oriented beds being of substantially the same thickness in the direction of horizontal gas flow therethrough.

4. The method of claim 3 wherein step (e) further comprises vertically flowing a minor portion of at least one substream through free-standing uncompressed sample granular adsorbent having a thickness in the direction of vertical gas flow therethrough at most equal to the thickness of said free-standing uncompressed adsorbent bed in the direction of horizontal gas flow therethrough.

5. The method of claim 4 wherein flow rate of contaminated gas per unit area of adsorbent bed exposed to gas flow is substantially the same as flow rate of contaminated gas per unit area of sample adsorbent exposed to gas flow.

6. The method of claim 4 wherein the sample adsorbent and adsorbent in the adsorbent beds are packed at the same packing density.

7. The method of claim 6 wherein the adsorbent is silver zeolite.

8. The method of claim 6 wherein the adsorbent is activated carbon.

9. The method of claim 8 wherein the activated carbon is impregnated with a material selected from the group consisting of potassium iodide, elemental iodine, triethylene diamine and lead.

10. A method for removing radioactive isotopes from a contaminated gas stream comprising the steps of:

(a) feeding the entire gas stream horizontally through a closed duct;
(b) diverting a minor portion of said horizontally flowing stream from the remaining stream major portion into a curvilinear conduit for changing direction of flow of said minor portion from horizontal to vertical;
(c) vertically flow said minor portion of said stream through a free-standing uncompressed column of sample granular adsorbent material contained in a sample canister wherein radioactive isotopes are adsorbed from said minor portion of said stream;
(d) dividing at least the remaining portion of said stream along vertical lines into a plurality of horizontally flowing substreams; and
(e) forcing each substream laterally through at least one vertically upstanding bed of free-standing uncompressed particular granular adsorbent material wherein radioactive isotopes are adsorbed from said substream;

wherein all gas flow through said vertically upstanding adsorbent bed is horizontal and all gas flow through adsorbent material in a sample canister is vertical.

11. The method of claim 10 comprising the further step of:
(f) combining said minor portion of said stream with the remainder of said stream;

wherein step f is performed after step (c); and wherein step (d) further comprises dividing said combined stream into a plurality of substreams.

12. The method of claim 10 wherein step (e) further comprises the simultaneously performed substeps of forcing a first subportion of at least one substream horizontally through a first vertically oriented bed of free-standing uncompressed granular particulate adsorbent while forcing a remaining subportion of said substream horizontally through a second vertically oriented bed of said free-standing uncompressed granular particulate adsorbent.

13. The method of claim 12 wherein step (c) further comprises vertically flowing only a portion of said stream through sample adsorbent having thickness in the vertical direction at most equal to the thickness of one of said beds of free-standing uncompressed granular adsorbent in the direction of horizontal gas flow therethrough.

14. The method of claim 13 wherein flow rate of contaminated gas per unit area of adsorbent bed exposed to gas flow is substantially the same as flow rate of contaminated gas per unit area of sample adsorbent exposed to gas flow.

15. The method of claim 13 wherein the sample adsorbent and adsorbent in the adsorbent beds are packed at the same packing density.

16. The method of claim 15 wherein the adsorbent is silver zeolite.

17. The method of claim 15 wherein the adsorbent is activated carbon.

18. The method of claim 17 wherein the activated carbon is impregnated with a material selected from the group consisting of potassium iodide, elemental iodine, triethylene diamine and lead.

* * * * *